Sept. 2, 1958    W. R. FELTZ    2,850,196
JOINT STRUCTURE
Filed June 6, 1955
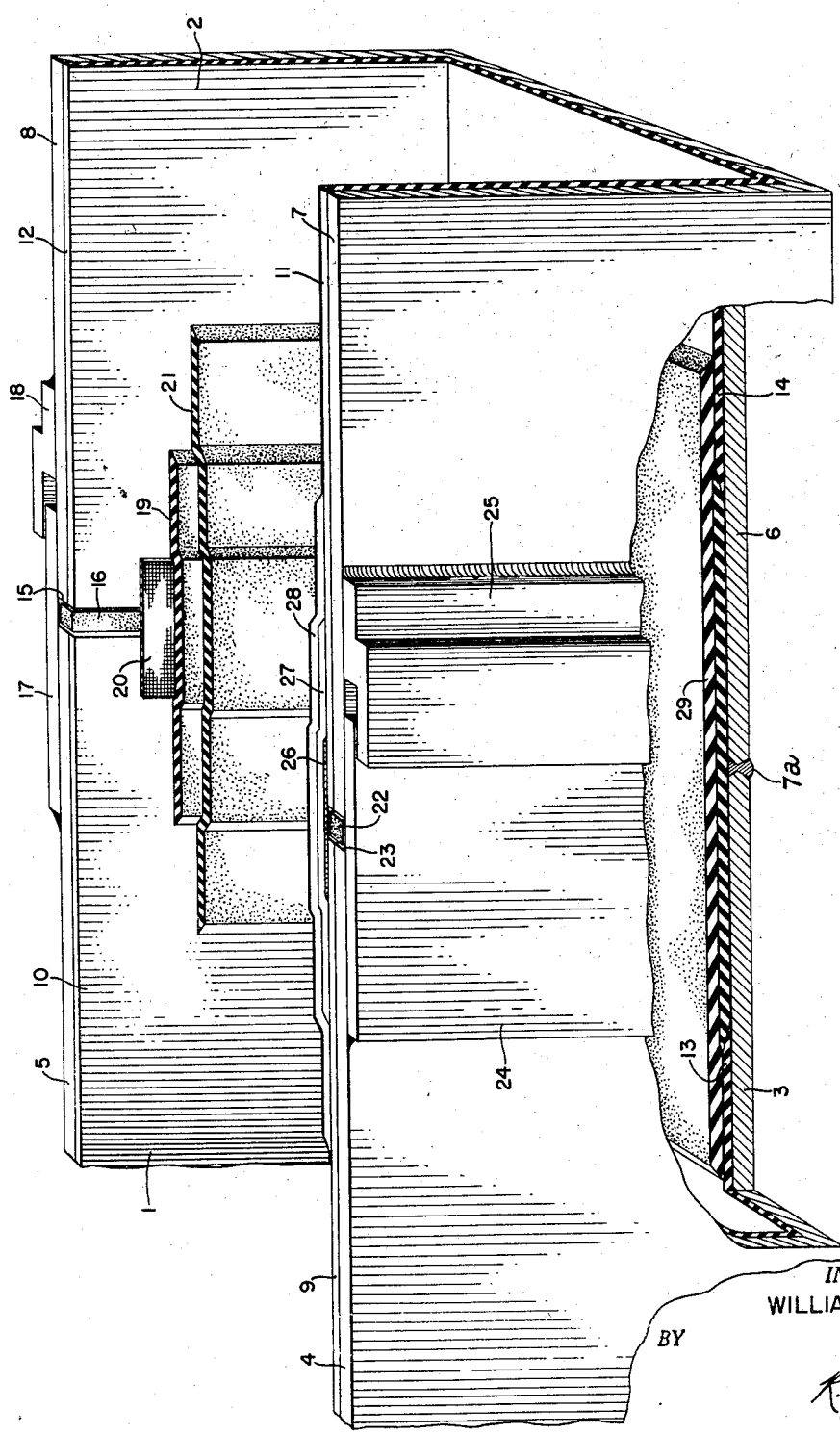
INVENTOR.
WILLIAM R. FELTZ
BY
R. L. Miller
ATTORNEY United States Patent Office 2,850,196
Patented Sept. 2, 1958

2,850,196

JOINT STRUCTURE

William R. Feltz, Greensboro, N. C., assignor to The Goodyear Tire & Rubber Company, Akron, Ohio, a corporation of Ohio Application June 6, 1955, Serial No. 513,393

4 Claims. (Cl. 220—5)

This invention relates to a construction for an expansion joint and more particularly to an expansion joint between flat plates, such as occur in abutting conduits, to compensate for thermal expansion differentials.

In the operation of continuous production lines utilizing open or covered conduits or tanks of considerable length containing heated fluids, difficulty is frequently experienced in obtaining fluid-tight joints between adjoining conduit sections. The problem is especially aggravated in applications such as continuous pickling tanks for steel products which, in view of the corrosive nature of the bath liquid, are generally lined internally with corrosion-resisting materials. In such tanks, a temperature differential may exist in the pickling solution between the bottom and top portions. Upon initial heating from ambient to operating temperature, the bottom of the tank will expand thermally in uniform manner and a welded joint may be utilized between the bottoms of adjoining sections with provision made for free thermal expansion by supporting the tanks on devices such as rollers and the like. However, due to the temperature differential therealong, the sides of the tank (where the liquid therein is usually at a higher temperature level at the surface than at the bottom) expand more on the top than on the bottom. A joining, by welding abutting sides together, is therefore unsatisfactory, as such varying thermal expansions cause buckling and similar undesirable distortions of the tank sides. It is to the problem of providing for a flexible and self-adjusting joint construction for such tank side portions that this invention is directed.

The general object of the invention is to provide a satisfactory joint construction between the abutting edges of two plates having a temperature differential along the length of the joint therebetween.

A further object of the invention is to provide a joint of this type that is satisfactory for use in production lines wherein corrosive heated liquids are utilized.

A still further object of the invention is to provide a joint of this type that is simple and efficient in operation and use and is economical of manufacture and maintenance.

The aforesaid objects of the invention, and other objects which will become apparent as the description proceeds, are achieved by providing a gap between the abutting plates having a bar of elastomeric material lying loosely therein. On the inner side of the plates, consecutively overlying resilient strips of elastomeric material are placed, overlapping the gap on either side and bonded to the sides of the tank along the contact area therebetween. To enable the bar to be free of movement and also provide a wider working section of the resilient strips, a flexible strip of material nonadhering to the resilient strips may be provided between the bar and adjacent plate portions and the resilient strips. On the other side of the gap, means are provided to retain the bar therein and also to maintain alignment of the abutting plates while retaining freedom of angular longitudinal movement.

In the drawing, a perspective view of two abutting tank sections with cut-away sections illustrating the invention is shown.

The overall tank length is formed of individual tank sections 1 and 2 placed in abutting relation. As shown, the conduit section 1 is an open-top tank having a horizontal bottom portion 3 and two vertical side portions 4 and 5. Similarly the tank section 2 has a bottom portion 6 and two side portions 7 and 8. Both sections may be of extensive length and adjoin additional sections to form a long open-top tank such as may be utilized in a production line. For purpose of clarity and simplicity of illustration, only one joint between such sections is shown in the figure.

As previously mentioned, the tank, as illustrated, in operation contains heated liquid baths of various types, and the temperatures at various levels of the liquid in the tank varies. As a consequence, the bottom plates 3 and 6, although longitudinally expanding due to the initial heating of the contained bath from ambient to operating temperature, expand uniformly along their respective lengths, and, when the tank length is freely supported on devices such as rollers, no problem arises. This, of course, is due to lack of any significant temperature differential at operating conditions across the width of the bottom portions 3 and 6. Therefore, as shown in the drawing, the portion 3 may be rigidly attached to the portion 6 by means such as a weld.

However, if similar welds were made at the abutting junctions of vertical sides 4 and 7 and also at 5 and 8, the unequal thermal expansion of the upper edges as compared to the lower edges thereof results in the buckling and "bowing-out" of the tank sides, which, of course, is highly undesirable. To illustrate, the vertical side 7, with higher temperatures in the upper levels of the liquid than those in the liquid adjacent the junction of the side 7 and the bottom 6, thermally lengthens considerably more along the upper portion than the bottom portion. The net result is that the upper unsupported edge of the side 7 tends to move outwardly in an arc thus permanently distorting the tank section 2. At the same time, of course, the top edges of the portions 4, 5 and 8 would be subject to the same thermal expansion and likewise tend to distort in similar manner. To provide for such thermal distortions, a joint construction is utilized as shown in the drawing between the vertical portions 4 and 7 and also between the portions 5 and 6.

Depending on the type of liquid with regard to corrosiveness, etc., contained therein, the tank may or may not be lined with various materials. In the drawing such internal linings 9 through 14 inclusive are shown bonded to the conduit portions 4, 5, 7, 8, 3, and 6 respectively and in the order named. Any of many suitable lining materials may be utilized such as are well-known to one skilled in the art. In the embodiment of the invention illustrated the rubber lining is applied by direct vulcanization to metal tank sections.

In the joint between the vertical sides 5 and 8, a gap 15 is provided therebetween having a bar 16 of elastomeric material extending the length of the joint placed therein. The relative cross-sectional proportions of the bar 16 and the gap 15 are such that the bar 16 lies loosely therein; the cross-sectional area of the bar 16 being substantially less than the cross-sectional area of the gap 15.

On the outer surface of the joint between the side portions 5 and 8, and overlapping onto both of the portions 5 and 8, is a rigid plate 17 preferably of metal. The plate 17 extends the full length of the gap 15 and is welded along one edge to the side portion 5. A matching and coengaging offset plate 18 is suitably welded to the side portion 8. The plates 17 and 18 serve a dual function in that not only is the bar 16 confined and restrained from projecting outwardly, but also the tank lengths 1 and 2 are aligned in a free manner with respect to each other.

On the inner side of the gap 15, a resilient strip 19 of elastomeric material is placed extending the entire length of the gap 15 and a width sufficient to overlap the gap 15 and extend substantially onto both the tank sides and the linings 10 and 12. A flexible strip 20, also extending the length of the gap 15, but narrower in width than the resilient strip 19, is placed to symmetrically overlie the gap 15 and extend to a substantial degree onto the linings 10 and 12. The flexible strip 20 is of a material that is nonadhering as to the materials contacting therewith, thereby permitting the bar 16 to be free in movement within the gap 15. In one embodiment, where the bar 16, the tank linings 10 and 12, and the resilient strip 19 were of rubber materials, the strip 20 was formed of Holland cloth. Although in an arrangement of this type there is some adherence initially between the Holland strip and the resilient strip immediately adjacent thereto, the free movement of the bar 16 is not impaired and the resiliency of the strip 19 likewise after initial distortion becomes operable. The purpose and functioning of the strip 20 will become apparent more fully as the description proceeds.

Overlying the resilient strip 19 is another similar resilient strip 21, which is of the same length as the strip 19 but of a wider width to overlap the strip 19 onto the linings 10 and 12. The resilient strip 19 is suitably bonded to the tank linings 10 and 12 along the common contact area therebetween. Likewise the resilient strip 21 is bonded to the linings 10 and 12 and also to the resilient strip 19 along the common contact area therebetween.

The joint between the other vertical portions 4 and 7 of the conduit lengths 1 and 2 respectively is sealed in similar manner. A bar 22 is placed into a gap 23 and confining and aligning plates 24 and 25 are provided on the outer side of the gap 23. On the inner surface a flexible strip 26, and two resilient strips 27 and 28, are placed in the order named extending inwardly from the gap 23. The resilient strips 27 and 28 are suitably bonded to their respective surfaces in manner similar to that of the strips 19 and 21.

In operation, assuming the temperature levels are those previously described in that the bottom level of the enclosed liquid is cooler than the top surface thereof, the varying thermal expansions of the side portions 5 and 8 cause the gap 15 therebetween to close substantially more at the top level than at the bottom level and place the bar 16 under compression. This freedom of movement prevents distortion of the vertical sides 5 and 8. Compression also occurs in the resilient strips 19 and 21. After the first application of a temperature differential, and in view of the fact that where rubber is used it will take a compression set especially at elevated temperatures, the subsequent cooling down of the joint assembly places the resilient strips 19 and 21 in a tension condition. The function of the flexible nonadhering strip 20 will now be apparent in that as the flexible working width of the strips 19 and 21 is effectively that of the flexible strip 20, this residual tensile force is distributed over a considerably longer width than would be possible if the resilient strip 19 were bonded along all its width, excepting for the width of the gap 15, to the plates 5 and 8. The longer effective length greatly reduces the tensile force acting thereon and thereby considerably reduces the possibility of rupture thereof. It will also now be appreciated that an important function of the bar 16 is to prevent the "pinching" of the overlying resilient strips between the metal edges of the plates 5 and 8 with danger of failure by rupture thereby. The operation of the joint between the vertical portions 4 and 7 is, of course, identical and concurrent with that of the joint between the portions 5 and 8 described immediately above. The free movement inherent in the coaction of the rigid plates 17 and 18 and also 24 and 25 also now will be appreciated to a greater degree.

In view of the relatively long overall length of tanks utilized, necessarily the sealing of the joints between abutting sections need be accomplished at the assembly location. To illustrate the method of the invention in the assembly of the joint seal, tank sections 1 and 2 previously internally lined with a material such as a thin layer of factory cured rubber, are placed in abutting relation with the bottom plates 3 and 6 thereof in close contact and the side portions 4 and 7 and also 5 and 8 in alignment and separated by their respective gaps 23 and 15. The bordering edges of the bottom linings 13 and 14 are then cut-back and, after proper preparation, the bottom plates 3 and 6 secured by the weld 7a therebetween. A seal strip 29 of material such as rubber is then laid over the weld joint and suitably bonded to prevent corrosive attack on the exposed portions of the bottom plates 3 and 6. Assembly of the side seals is started by placing resilient bars 16 and 22, which may be of rubber material, in their respective gaps 15 and 23. The resilient strips 19 and 27 may be formed of rubber having a Holland cloth backing laid thereon. This cloth backing is removed along the edges of the resilient strip leaving a center portion attached thereto, and then the thus prepared strip is placed overlapping the gap and onto the lining and suitably bonded to the latter. Additional similar resilient strips may subsequently be superimposed if required. A temperature gradient may then be applied along the length of the vertical joints and upon subsequent removal of the temperature gradient the permanent tension effect described heretofore may be attained. This temperature gradient is best secured by filling the tank as under operating conditions, and heating the liquid so contained.

It will be understood that various other means well known in the art may be utilized to achieve the alignment and free movement features of the plates 17 and 18 and also the plates 24 and 25. It also will be apparent to one skilled in the art that various modifications can be made of the embodiment shown. The resilient strips 21 and 28 are but reinforcing and sealing means for the resilient strips 19 and 27 respectively, and could be eliminated in certain applications where strength, corrosive action, etc., are not considerations; likewise, additional resilient strips overlapping the strips 21 and 28 may be applied in certain applications. Where the resilient strips 19 and 27 are of materials such as can be applied without adherence to the bars 16 and 22, the flexible strips 20 and 26 can be eliminated and the strips 19 and 27 suitably bonded along the edges thereof in such manner as to obtain a substantial central section that is unbonded. It will be apparent that where the strips 19 and 27 are of rubber, flexible strips 20 and 26 of a material such as Holland cloth are necessary to prevent adherence between the resilient strips 19 and 27 and bars 16 and 22, respectively.

While certain representative embodiments are shown for the purpose of illustrating the invention, it will be apparent to those skilled in this art that various changes and modifications may be made therein without departing from the spirit or scope of the invention.

I claim:

1. An expansion joint construction for sealing the gap between adjacent spaced opposed edges of two rigid lined plates subjected to a temperature gradient along the abutting length thereof and causing relative movement between the plates comprising a bar of elastomeric material of a size to substantially fill the gap between the plates and of a length substantially that of the joint to be sealed, said bar being confined but unattached in the gap, means closing the gap on one side and arranged to maintain the flat plates in substantial alignment while moving longitudinally, a resilient strip of elastomeric material closing the gap on the opposite side and overlying the contiguous faces of the plates with the strip adhered to the faces of the plates remote from the edges thereof but the portions of the strip adjacent the edges of the plates being nonadhered, and a flexible strip of material nonadhering to and placed between the bar and the resilient strip and symmetrically overlapping the edges of the plates to permit unrestrained movement of the bar in the gap due to relative movement of the plates.

2. In an expansion joint construction for sealing the gap between adjacent spaced opposed edges of two open-top tank lengths, each having a bottom portion with a side portion rigidly attached to each of the opposite edges thereof and said tank lengths containing a medium such that a temperature gradient is present along the length of the opposed edges of the side portions thereof, a joint construction therebetween to compensate for varying thermal expansion of the side portions due to said temperature gradient comprising rigid sealing fastening means between the abutting edges of the bottom portions, and extensible sealing means between each of the abutting edges of the side portions, each such extensible means including a bar of elastomeric material between the edges of said adjoining side portions with said bar of a size to lie loosely in a gap provided therefor therebetween and a length substantially that of the joint to be sealed, means closing the gap on one side and arranged to maintain said side portions in substantially continuous alignment transversely while retaining freedom of angular longitudinal movement, a first resilient strip of elastomeric material closing the gap on the opposite side thereof and overlying the contiguous faces of both said side portions, a flexible strip of material nonadhering to and placed between the bar and the first resilient strip and symmetrically overlapping both said side portions to permit unrestrained movement of the enclosed bar, and at least one additional resilient strip symmetrically overlying and overlapping the said first resilient strip and both said side portions and sealingly bonded along the contacting area therebetween.

3. An expansion joint construction for sealing the gap between adjacent spaced opposed edges of two rigid lined plates subjected to a temperature gradient along the abutting length thereof and causing relative movement between the plates comprising a bar of elastomeric material of a size to substantially fill the gap between the plates and of a length substantially that of the joint to be sealed, said bar being confined in the gap, means closing the gap on one side and arranged to maintain the flat plates in substantial alignment while moving longitudinally, and a resilient strip of elastomeric material closing the gap on the opposite side thereof and overlying the contiguous faces of the plates with the strip being adhered to the faces of the plates remote from the edges thereof but the portion of the strip adjacent the edges of the plates being nonadhered to permit unrestrained movement of the bar in the gap due to relative movement of the plates.

4. In an expansion joint construction for sealing the gap between adjacent spaced opposed edges of two open-top tank lengths each having a bottom portion with a side portion rigidly attached to each of the opposite edges thereof and said tank lengths containing a medium such that a temperature gradient is present along the length of the opposed edges of the side portions thereof, a joint construction therebetween to compensate for varying thermal expansion of the side portions due to said temperature gradient comprising rigid sealing fastening means between the abutting edges of the bottom portions, and extensible sealing means between each of the abutting edges of the side portions, each such extensible means including a bar of elastomeric material between the edges of said adjoining side portions with said bar of a size to lie loosely in the gap provided therefor therebetween and a length substantially that of the joint to be sealed, means closing the gap on one side and arranged to maintain said side portions in substantially continuous alignment transversely while retaining freedom of angular longitudinal movement, a resilient strip of elastomeric material closing the gap on the opposite side thereof and overlying the contiguous faces of both said side portions, and a flexible strip of material nonadhering to and placed between the bar and the resilient strip and symmetrically overlapping both said side portions to permit unrestrained movement of the bar in the gap due to relative movement of said portions.

References Cited in the file of this patent

UNITED STATES PATENTS

| | | |
|---|---|---|
| 1,740,110 | Oden | Dec. 17, 1929 |
| 2,308,677 | Dailey | Jan. 19, 1943 |
| 2,580,034 | Lyons | Dec. 25, 1951 |